United States Patent
Funahashi

(10) Patent No.: US 7,980,360 B2
(45) Date of Patent: Jul. 19, 2011

(54) TRANSMISSION SYSTEM

(75) Inventor: Koji Funahashi, Nagoya (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 344 days.

(21) Appl. No.: 11/662,070

(22) PCT Filed: Sep. 13, 2005

(86) PCT No.: PCT/JP2005/016803
§ 371 (c)(1),
(2), (4) Date: Mar. 7, 2007

(87) PCT Pub. No.: WO2006/030758
PCT Pub. Date: Mar. 23, 2006

(65) Prior Publication Data
US 2008/0087125 A1     Apr. 17, 2008

(30) Foreign Application Priority Data

Sep. 14, 2004  (JP) .................................. 2004-266156

(51) Int. Cl.
*F16H 57/04* (2010.01)
(52) U.S. Cl. ...................................................... 184/6.12
(58) Field of Classification Search ................. 184/6.12; 74/467
See application file for complete search history.

(56) References Cited

U.S. PATENT DOCUMENTS

| | | | | |
|---|---|---|---|---|
| 5,644,954 A | * | 7/1997 | Matsufuji | 74/606 R |
| 5,946,971 A | * | 9/1999 | Toyota et al. | 74/331 |
| 6,341,489 B1 | * | 1/2002 | Iida | 60/487 |
| 6,843,747 B1 | * | 1/2005 | Phanco et al. | 475/161 |

FOREIGN PATENT DOCUMENTS

| | | |
|---|---|---|
| JP | S45-30501 B1 | 10/1970 |
| JP | 60-097453 U | 7/1985 |
| JP | H03-096461 U | 10/1991 |
| JP | H08-132898 | 5/1996 |
| JP | H10-103428 | 4/1998 |
| JP | 2002-227876 | 8/2002 |

OTHER PUBLICATIONS

The Extended European Search Report dated Sep. 2, 2010 in the corresponding European Patent Application No. 05783657.9.

* cited by examiner

*Primary Examiner* — Michael R Mansen
*Assistant Examiner* — Robert T Reese
(74) *Attorney, Agent, or Firm* — Global IP Counselors, LLP

(57) ABSTRACT

A transmission system is equipped with rotating member(s) and a shaft member upon which the rotating member(s) is/are carried. A projecting support portion projecting inwardly and supporting the shaft member is formed in the casing of the transmission system with at least a part of the projecting support portion dipping into the lubricating oil in the casing, and the specific gravity of the projecting support portion being set to be lower than that of the lubricating oil.

8 Claims, 3 Drawing Sheets

1: Transmission  2: Casing  5: Projecting support portion  G: Rotating member  S: Shaft Member 1: Transmission   2: Casing   5: Projecting support portion   G: Rotating member   S: Shaft Member

TRANSMISSION SYSTEM

CROSS-REFERENCE TO RELATED APPLICATIONS

This U.S. National stage application claims priority under 35 U.S.C. §119(a) to Japanese Patent Application No. 2004-266156, filed in Japan on Sep. 14, 2004, the entire contents of which are hereby incorporated by reference.

BACKGROUND OF THE INVENTION

1. Field of the Invention

The present invention generally relates to a transmission system such as the transmission of a vehicle.

2. Background Information

An example of a lubricating structure of the gear system of the transmission of a vehicle is disclosed in Japanese Utility Model Register No. 2590907 (Pages 2-5, FIG. 1). Until now, a lubricating structure of the gear system of the transmission of a vehicle has been provided, such that the structure lubricating the engaging parts of the gear system is accomplished by scraping the lubricating oil upward from the oil collecting part with the teeth of the gears of the gear system in which a plural number of gears are carried on the same shaft in the housing. In this case, a baffle plate, forming a plural number of stairs corresponding to the shape of the gears, is arrayed at the bottom of the housing, to raise substantially the bottom of the housing, so as to raise the oil level without increasing the amount of the oil.

SUMMARY OF THE INVENTION

However, in the conventional structure, the baffle plate is arranged at the bottom of the housing and has only one function which is to raise the oil level to reduce the amount of the oil. Therefore, a plural number of parts for functions besides the function of reducing the amount of oil to reduce weight may be necessary.

To solve the problem, the present invention relates to the provision of a transmission system comprises a casing, a shaft member, at least one rotating member and a support portion. The casing is configured to receive lubricating oil with a prescribed specific gravity. The shaft member is disposed in the casing. The rotating member is mounted on the shaft member. The support portion supports a first end of the shaft member, and has at least a part of the support portion projecting inwardly into the casing such that the support portion projects into the lubricating oil in the casing. The support portion has a prescribed specific gravity that is lower than the specific gravity of the lubricating oil.

In the transmission of the present invention, since at least a part of the projecting support portion dips into the lubrication oil, and the specific gravity of the projecting support portion is set to be lower than that of the lubricating oil, the volume of the lubricating oil can be reduced corresponding to the volume of the projecting support portion dipping into the lubricating oil, without changing the height of the oil level.

Other aspects of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
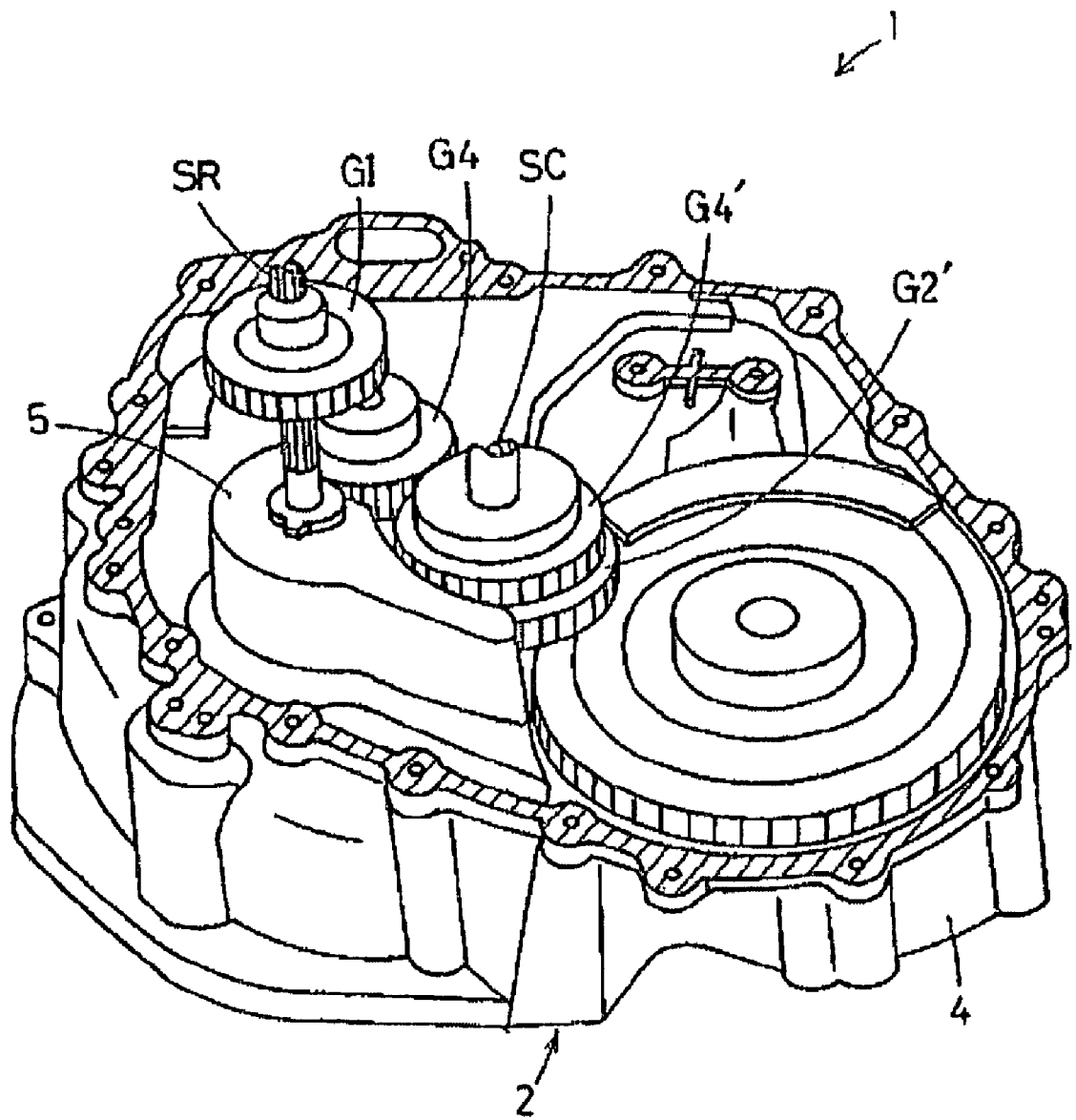
FIG. 1 is a perspective sectional view of a transmission.
Figure 2:
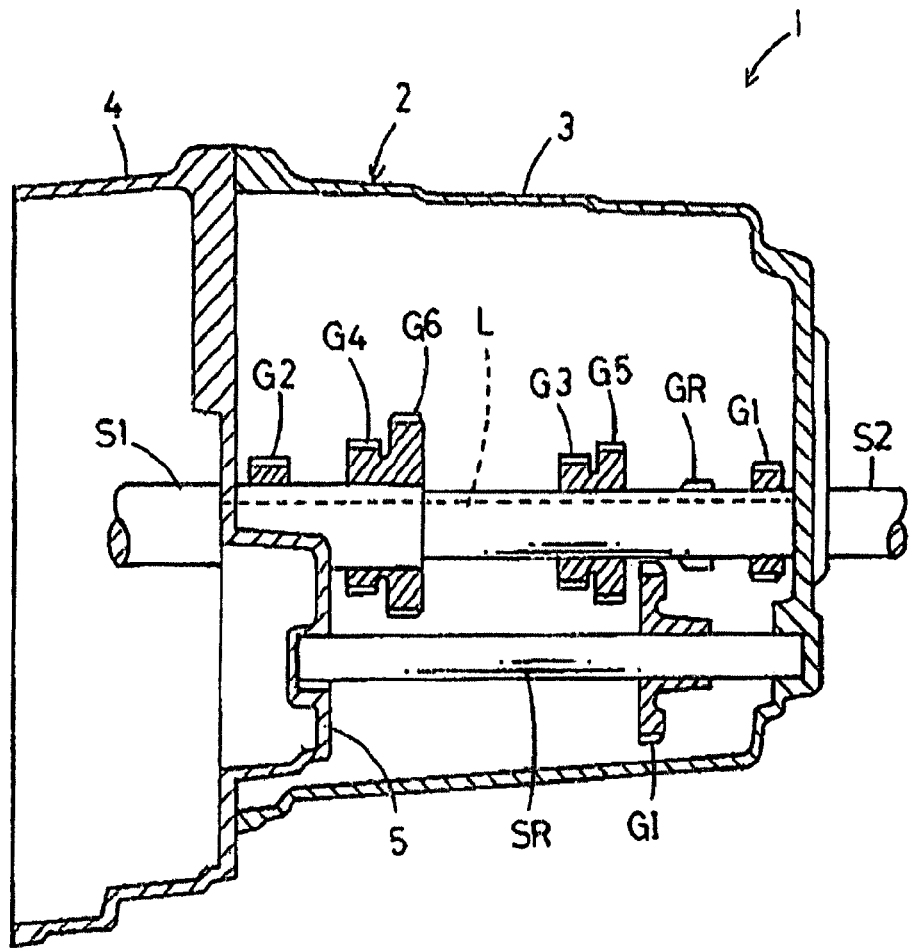
FIG. 2 is a longitudinal cross sectional view of the transmission illustrated in FIG. 1, with selected parts removed for purposes of illustration.
Figure 3:
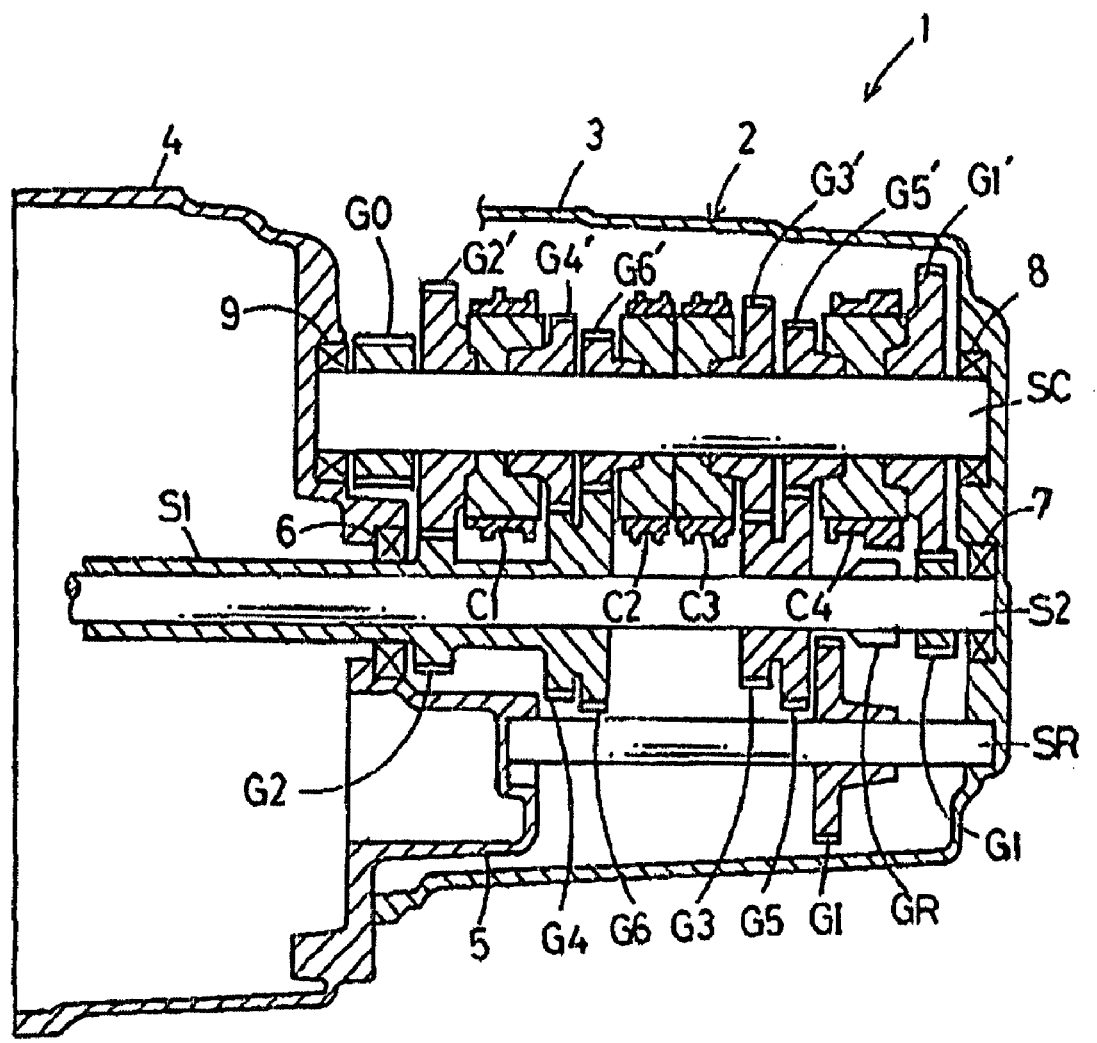
FIG. 3 is a longitudinal cross sectional view of the transmission illustrated in FIGS. 1 and 2.

The present invention is described by an embodiment shown in FIGS. 1 to 3. In this embodiment, a twin clutch system, automatic shift type manual transmission 1 of a vehicle is illustrated as the transmission system. The automatic shift type transmission 1 is equipped with an actuator rod (not shown in Figures) which slides and rotate by an actuator (not shown in Figures), the actuator being worked by the operation of a shift lever (not shown in Figures), and in the transmission 1, gear shifting is carried out by the engaging of drive gears G (represented as G grouping G1 to G6 and GR in FIGS. 2 and 3) as a rotating member, with driven gears G' (represented as G' grouping G1' to G6' in FIG. 3) by the operation of a shifter connected to the actuator rod.

The twin clutch type transmission 1 includes a casing 2 of the transmission 1, a first input shaft S1 and a second input shaft S2, which are both shaft members, a reverse idler shaft SR carrying a reverse idler gear GI, which transforms the rotation of the second input shaft S2, reversing its rotation, and a counter shaft SC, which transmits power from the first input shaft S1 or the second input shaft S2, and which produces power with which to power wheels (not shown in Figures) through a differential gear (not shown in Figures).

The casing 2 of the transmission 1 has a main casing 3, and a side casing 4 fixed to the side of the main casing 3, and a projecting support portion 5 projecting inwardly is formed in the middle under section of the side area of the side casing 4.

A hollow part is formed on one side of the first input shaft S1, the other side of the first input shaft S1 being supported in the middle part of the side casing 4 by a ball bearing 6. Further, the other side of the second input shaft S2 is inserted in and supported by the hollow part of the first input shaft, and one side of the second input shaft S2 is supported in the middle part of the main casing 3 by a ball bearing 7. Further, the other sides of the first input shaft S1 and the second input shaft S2 are connected to a drive shaft driven by the engine through a clutch and the like, including a damper, these not being shown in Figures.

The $2^{nd}$-speed drive gear G2, the $4^{th}$-speed drive gear G4, and the $6^{th}$ speed drive gear G6 are fixedly carried on the first input shaft S1, in order, from the other side (the ball bearing 6 side) of the first input shaft, and $1^{st}$-speed drive gear G1, reverse drive gear GR, the $5^{th}$-speed drive gear G5, and the $3^{rd}$-speed drive gear G3 are fixedly carried on the second input shaft S2, in order, from one side (the side with the ball bearing 7) of the second input shaft S2. As described above, since the $2^{nd}$-speed drive gear G2, the $1^{st}$-speed drive gear G1, the reverse drive gear, and the like, transmitting power with a low speed rotation and large torque, are arranged near the ball bearings 6 and 7, so that loads on the first input shaft S1 and the second input shaft S2 can be reduced, to improve mechanical strength.

One side of the counter shaft SC is supported in the middle of the main casing 3 by a roller bearing 8, and the other side of the counter shaft SC is supported in the middle of the side casing 4 by a roller bearing 9. Further, the $1^{st}$-speed driven gear G1', the reverse driven gear GR', the $5^{th}$-speed driven gear G5', the $3^{rd}$ speed driven gear G3', the $6^{th}$-speed driven gear G6', the $4^{th}$-speed driven gear G4', the $2^{nd}$-speed driven gear G2', and an output gear GO, are each rotatably carried on the counter shaft SC, in order, from one side (the side with the ball bearing 8) of the counter shaft SC. Still further, $2^{nd}$ to $4^{th}$ speed synchromesh C1, $6^{th}$-speed synchromesh C2, $3^{rd}$-speed synchromesh C3, and the $1^{st}$ to $5^{th}$ speed synchromesh C4, are fixedly carried on the counter shaft SC, and the drive gears G1 to G6, and the driven gears G1' to G6', can be selectively engaged by the synchromeshes C1 to C4.

One side of the reverse idler shaft SR is fixedly supported in the middle under section of the side area of the main casing 3, and the other side of the reverse idler shaft SR being fixedly supported in the projecting support portion 5 of the side casing 4. Further, a reverse idler gear GI is rotatably carried on the reverse idler shaft SR. In this embodiment, since the reverse idler shaft SR is arranged near the $4^{th}$-speed drive gear G4 and the $6^{th}$-speed drive gear G6, the diameter of the reverse idler shaft SR is reduced, so as to avoid interference with the $4^{th}$-speed drive gear G4 and the $6^{th}$-speed drive gear G6.

Further, lubricating oil (not shown in Figures) is put in the casing 2 of the transmission 1, with an oil accumulating part being formed in the under section of the casing 2, as shown by the broken line in FIG. 2, the height of the oil level L being set to be roughly the height of the middle of the casing 2, SO that the projecting support portion 5 dips wholly into the lubricating oil. In this embodiment, the projecting support portion 5 is hollow, so as to have a lower specific gravity than that of the lubricating oil.

Still, further, the shape of the part of the projecting support portion 5, which is on the side of the first input shaft S1, is set to be concave shape along the shape of the circumference of the part of the $2^{nd}$-speed drive gear G2, which is carried on the first input shaft S1, and the part of the $2^{nd}$-speed driven gear G2', which is carried on the counter shaft SC, these parts being on the side of the projecting support portion 5 and dipping into the lubricating oil (see FIG. 1).

In a case where lubrication is performed in the transmission 1, where the $2^{nd}$-speed drive gear G2, the $4^{th}$-speed drive gear G4 and the $6^{th}$-speed drive gear G6, which are each carried on the first input shaft S1, and the $1^{st}$-speed drive gear G1, $3^{rd}$-speed drive gear G3, the $5^{th}$-speed drive gear G5 and the reverse gear GR, which are each carried on the second input shaft S2, each revolve, the lubricating oil is scraped upward by the teeth of the drive gears G1 to G6 and GR, which each revolve to lubricate.

As described above, since at least a part of the projecting support portion 5 (in this embodiment, the whole projecting support portion 5) dips into the lubricating oil, and the specific gravity of the projecting support portion 5 is set to be lower than that of the lubricating oil, the amount of lubricating oil can be reduced corresponding to the volume of the projecting support portion 5 dipping into the lubricating oil. In this embodiment, the projecting support portion 5 is to be hollow, easily reducing its specific gravity. Still further, since the reverse idler shaft SR, which is a shaft member, is supported by the projecting support portion 5 projecting inwardly in the casing 2, the length of the reverse idler shaft SR can be shortened corresponding to the length that the projecting support portion projects, improving the rigidity of the reverse idler shaft SR. Accordingly, in the transmission 1, the amount of lubricating oil can be reduced corresponding to the volume of the projecting support portion 5, reducing the weight of the transmission 1, and the rigidity of the reverse idler shaft SR can be improved, also improving the durability of the transmission 1.

Further, since at least a part (a part on the side of the first input shaft S1) of the projecting support portion 5 is set to have a shape corresponding to at least a part (a part on the side of the projecting support portion 5 of the $2^{nd}$-speed drive gear G2) of the rotating member, the projecting support portion 5 does not interfere with the $2^{nd}$-speed drive gear G2, so that the volume of the projecting support portion 5 can be effectively enlarged. Furthermore, since at least a part (a part on the side of the first input shaft S1) of the projecting support portion is set to have a shape corresponding to that of a part (a part on the side of the projecting support portion 5) of the $2^{nd}$-speed drive gear G2, which dips into the lubricating oil, when the $2^{nd}$-speed drive gear G2, being a rotating member, rotates along the shape of the projecting support portion 5, the lubricating oil can be effectively scraped upward by the teeth of the $2^{nd}$-speed drive gear G2. Still further, in this embodiment, since the projecting support portion 5 dips wholly into the lubricating oil, the amount of lubricating oil can be greatly and effectively reduced, compared with a case where only a part of the projecting support portion dips into the lubricating oil, so that the transmission 1, which is a power train system, can be planned to be further lightened. In addition, since the casing 2 of the transmission includes the main casing 3 and the side casing 4, which is attached to the side of the main casing 3, and with the projecting support portion 5 being formed in the side casing 4, even if the shape of the projecting support portion 5 is complex, the projecting support portion 5 can be processed easily to form, compared with a case where the projecting support portion 5 is formed in the main casing 3.

While the described embodiment represents the preferred form of the present invention, it is to be understood that the invention is not intended to be limited to this specific embodiment, and that modification and variation of the invention is possible according to purposes within its spirit and scope as set out in the accompanying claims. For instance in this embodiment, a twin clutch system automatic shift type manual transmission has been selected as the transmission system 1, but other than in this embodiment, the transmission system may be a common manual transmission, automatic transmission, or transfer.

In the present invention, the transmission system can be lightened, and its durability can also be improved, so that the present invention can be used industrially. In particular, since the shaft members S is supported by the projecting support portion 5 projecting inwardly in the casing 2, the length of the shaft member S can be shortened corresponding to the projection length of the projecting support portion 5. Also the rigidity of the shaft member S can be improved. Accordingly, in the present invention, the weight reduction of the transmission system 1 can be realized by reducing the amount of lubricating oil, and the durability of the transmission system can be improved by upgrading the rigidity of the shaft member S.

The invention claimed is:

1. A transmission system comprising:
   a casing configured to receive lubricating oil having a prescribed specific gravity with the lubricating oil being accumulated at a bottom part of the casing when the transmission system is installed in a vehicle;
   a first shaft member disposed in the casing;
   a second shaft member disposed in the casing and extending parallel to the first shaft member;
   a third shaft member disposed in the casing and extending parallel to the first and second shaft members;
   a first rotating gear member mounted on the first shaft member;

a second rotating gear member mounted on the second shaft member and engaging with the first rotating gear member; and a projecting support portion supporting a first end of the third shaft member, and the projecting support portion projecting inwardly into the casing such that at least a part of the projecting support portion is disposed below an oil level of the lubricating oil accumulated at the bottom part in the casing with the projecting support portion being disposed in a position facing a circumferential surface of the first rotating gear member, the projecting support portion having a prescribed specific gravity that is lower than the specific gravity of the lubricating oil, the part of the projecting support portion facing the circumferential surface of the first rotating gear member having a shape corresponding to a shape of at least a part of the circumferential surface of the first rotating gear member.

2. A transmission in accordance with claim 1, wherein the part of the projecting support portion has a shape corresponding to the shape of the part of the circumferential surface of the first rotating gear member, which is at least partially disposed in the casing to contact the lubricating oil.

3. A transmission in accordance with claim 1, wherein the projecting support portion is located entirely within the casing such that the projecting support portion is entirely disposed below the oil level of the lubricating oil.

4. A transmission in accordance with claim 1, wherein the casing includes a main case and a side case, which is a separate member from the main case and which is fixed to the main case, the projecting support portion being formed in the side case.

5. A transmission in accordance with claim 2, wherein the projecting support portion is located entirely within the casing such that the projecting support portion is entirely disposed below the oil level of the lubricating oil.

6. A transmission in accordance with claim 2, wherein the casing includes a main case and a side case, which is a separate member from the main case and which is fixed to the main case, the projecting support portion being formed in the side case.

7. A transmission in accordance with claim 5, wherein the casing includes a main case and a side case, which is a separate member from the main case and which is fixed to the main case, the projecting support portion being formed in the side case.

8. A transmission in accordance with claim 3, wherein the casing includes a main case and a side case, which is a separate member from the main case and which is fixed to the main case, the projecting support portion being formed in the side case.

* * * * *